US008642911B2

(12) United States Patent
Neebe et al.

(10) Patent No.: US 8,642,911 B2
(45) Date of Patent: Feb. 4, 2014

(54) ROUTE ENHANCED DISPATCH MODULE

(75) Inventors: Mark T. Neebe, Catonsville, MD (US); Matthew G. Good, Marriotsville, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 482 days.

(21) Appl. No.: 12/909,257

(22) Filed: Oct. 21, 2010

(65) Prior Publication Data

US 2012/0097584 A1 Apr. 26, 2012

(51) Int. Cl.
*G06K 9/00* (2006.01)
(52) U.S. Cl.
USPC ............ 209/584; 209/583; 209/606; 209/900
(58) Field of Classification Search
USPC .................. 209/583, 584, 606, 900; 198/586
See application file for complete search history.

(56) References Cited

U.S. PATENT DOCUMENTS

| 3,573,748 A * | 4/1971 | Holme .......................... 209/584 |
| 3,754,646 A * | 8/1973 | Henig .............................. 211/50 |
| 2006/0096896 A1* | 5/2006 | Campagnolle et al. ........ 209/584 |

* cited by examiner

*Primary Examiner* — Terrell Matthews
(74) *Attorney, Agent, or Firm* — Rothwell, Figg, Ernst & Manbeck, P.C.

(57) ABSTRACT

A route enhanced mail sorting and dispatch system and method sorts mail based on carrier route and then arranges the mail into delivery point order in a single pass that accommodates both letter and flat format mail. Mail sorting based on carrier routes and arrangement into delivery point order is achieved through a plurality of route enhanced dispatch modules. Each dispatch module has upper and lower helical mail conveyors. The lower helical mail conveyor is linearly translatable and can moved to a plurality of positions. Mail sorted based on carrier route is held in the upper helical mail conveyor before being placed or dropped into an allocated position in the lower helical mail conveyor by a put away shuttle. The lower helical mail conveyor can then be rotated to dispatch the mail in delivery point order.

15 Claims, 7 Drawing Sheets

ROUTE ENHANCED DISPATCH MODULE

BACKGROUND OF THE INVENTION

I. Field of the Invention

The present invention relates generally to mail sorting and, more particularly, to a mail sorting system and method for sorting mail into delivery point order in a single pass.

II. Discussion of the Background Art

Mail must be delivered in a timely and cost effective manner to support and maintain commercial activity in a free market economy. It has been found that both the processing time and cost associated with mail delivery can be reduced by sorting mail pieces into delivery point order (i.e., the sequential order in which mail pieces are to be delivered along a carrier route) before dispatch. However, sorting mail into delivery point order can be a complex and time consuming task.

Although most modern postal facilities include automated mail sorting equipment, the mail sorting equipment is generally configured to implement a two pass process in which each mail piece is fed into the mail sorting equipment twice for sorting. In the first pass, the address on each mail piece is read by an optical character reader (OCR), a destination code including information about carrier route and delivery point is assigned, and the mail piece is deposited in a bin in random order based on carrier route. The mail in the bins is then fed through the feeder a second time, scanned, and sorted into delivery point order based on the destination code.

A disadvantage of the two pass sorting process is that it increases the likelihood of damaging mail pieces and/or scanning errors, which can lead to additional cost and processing time. A further disadvantage of the current two pass process is that letters and flats mail generally cannot be sorted at the same time using the same equipment.

SUMMARY OF THE INVENTION

The present invention overcomes disadvantages of the prior art by providing a route enhanced dispatch system and method that can sort both letter and flat format mail into delivery point order in a single pass without manipulation of the mail pieces after initial put-away. Some advantages achieved by various embodiments of the invention include reduced footprint and manpower by enabling letters and flat format mail to be processed in the same machine, reduced dispatch cycle time, and increased capture rate of sequenced mail by allowing continuous processing until dispatch time.

An aspect of the invention is a route enhanced dispatch module for sorting mail pieces into delivery point order. The route enhanced dispatch module includes a first mail conveyor having a first plurality of mail slots, a second mail conveyor having a second plurality of mail slots, and a placement element configured to receive mail pieces from the first mail conveyor and place the mail pieces into the second mail conveyor. The first mail conveyor is configured to convey mail pieces in the first plurality of mail slots in a dispatch direction towards the placement element. The second mail conveyor is configured to convey mail pieces in the second plurality of mail slots in a dispatch direction towards a dispatch end of the second mail holder. At least one of the placement element and the second mail conveyor is configured to be moveable relative to the other of the placement element and the second mail conveyor. The module may further include a linear movement element configured to linearly move the second mail conveyor to align the placement element with one of the plurality of mail slots in the second mail conveyor. The linear movement element may be configured to linearly move the second mail conveyor to any of a plurality of positions along a linear axis parallel to a longitudinal axis of the second mail conveyor, and the placement element may include a guide positioned adjacent the first mail conveyor. The guide may be raised and lowered along a vertical track. The guide, when lowered, may extend partially into one of the plurality of mail slots of the second mail conveyor. The module may further including a ledge having a horizontal surface and positioned at the dispatch end of the first mail conveyor and adjacent to the guide. The horizontal surface of the ledge may be lower than a first horizontal surface positioned below the first mail conveyor, and mail pieces may be dropped or placed in the second mail conveyor after passing through a gap between the guide and the ledge. The guide may include sensors configured to detect when the mail pieces are placed into the second mail conveyor. The placement element may be a put-away shuttle, and the linear movement element may be configured to linearly move the put-away shuttle to any of a plurality of positions along a linear axis parallel to a longitudinal axis of the second mail conveyor. The linear movement element may be configured to move the put-away shuttle along a track extending in a direction parallel to a longitudinal axis of the second mail conveyor. The put-away shuttle may include a container configured to place mail pieces into the second mail conveyor after the linear movement element moves the put-away shuttle to a determined position of the plurality of positions along the linear axis parallel to the longitudinal axis of the second mail conveyor. The module may further include a moveable ledge positioned at the dispatch end of the first mail conveyor and above the container and configured to pivot between a closed position having a substantially horizontal surface and an open position having a substantially vertical surface. The module may further include an actuator configured to move the ledge between the open and closed positions. The substantially horizontal surface of the ledge when in the closed position may be lower than a first horizontal surface positioned below the first mail conveyor, and mail pieces may be dropped into the container when the ledge is in the open position. The first mail conveyor may be a first helical conveyor with a plurality of longitudinally spaced coils defining the first plurality of mail slots therebetween, and the first mail conveyor may be configured to convey mail pieces in the first plurality of mail slots in the dispatch direction through rotation of the coils. The module may further include a first horizontal surface below the first helical conveyor, wherein the mail pieces in the first helical conveyor rest on the first horizontal surface. The first horizontal surface may have a first groove running in the dispatch direction, and coils of the first helical conveyor may extend into the groove. The second mail conveyor may be a second helical conveyor with a plurality of longitudinally spaced coils defining the second plurality of mail slots therebetween, and the mail pieces in the second plurality of mail slots may be conveyed in the dispatch direction through rotation of the coils. The module may further include a second horizontal surface below the second helical conveyor, and the mail pieces in the second helical conveyor may rest on the second horizontal surface. The second horizontal surface may have a second groove running in the dispatch direction, and coils of the second helical conveyor may extend into the second groove.

Another aspect of the invention is a mail sorting system including a feeder configured to singulate mail pieces from a mail stack, a transporter configured to transport the singulated mail pieces along a mail path, and a plurality of the route enhanced dispatch modules disposed along the mail path. The system may further include an identification device configured to uniquely identify mail pieces received from the feeder and output the mail pieces to the transporter.

Another aspect of the invention is a route enhanced mail dispatch method, including the steps of: receiving mail pieces in a first mail conveyor having a first plurality of mail positions; for each mail piece, determining a position in a second mail conveyor having a second plurality of mail positions into which the mail piece is to be placed; and for each mail piece, moving at least one of the mail piece and the second mail holder relative to the other of the mail piece and the second mail holder and placing the mail piece into the second mail conveyor at the determined position. The positions in the second mail conveyor into which the mail pieces are placed are determined so that mail pieces placed in the second mail conveyor are arranged in the order in which the mail pieces will be delivered on a carrier route. The moving at least one of the mail piece and the second mail holder relative to the other of the mail piece and the second mail holder may include driving the second mail conveyor in a direction parallel to a longitudinal axis of the second mail conveyor to the determined position. The placing the mail piece into the second mail conveyor at the determined position may include guiding the mail pieces into the second mail conveyor using a guide located at a dispatch end of the first mail conveyor. The guiding the mail pieces into the second mail conveyor using the guide may include lowering the guide after the second mail conveyor is driven to the determined position and before the mail piece is placed in the determined position of the second mail conveyor. The guide of the shuttle may be lowered so as to partially extend between coils of the second mail conveyor defining the determined position into which the mail piece is to be placed. The guiding the mail pieces into the second mail conveyor using the guide further may include raising the guide of the shuttle after the mail piece is placed in the determined position of the second mail conveyor. The placing the mail piece into the second mail conveyor at the determined position may further include using sensors to determine whether the mail piece has been placed in the second mail conveyor. The method may further include driving the second mail conveyor in a direction parallel to a longitudinal axis of the second mail conveyor to the position determined for the next piece of mail to be placed in the second mail conveyor. The moving the at least one of the mail piece and the second mail holder relative to the other of the mail piece and the second mail holder may include placing the mail piece from the first mail conveyor into a holder and driving the holder along a track extending in a direction parallel to a longitudinal axis of the second mail conveyor. The method may further include driving the holder along the track extending in a direction parallel to the longitudinal axis of the second mail conveyor to position the holder below a dispatch end of the first mail conveyor after the placing the mail piece into the second mail conveyor at the determined position. The method may further include sorting mail pieces for the carrier route sorted from a mail path to the first mail conveyor. The determining may include using carrier route data and data about the mail piece to be placed to determine the position. The determining may further include using pre-information about the mail pieces to determine the position. The determining may further include using historical statistical data indicating the frequency with which mail pieces having no pre-information are delivered to stops along the carrier route to determine the position. The determining may further include using historical statistical data indicating the frequency with which mail pieces are delivered to stops along the carrier route to determine the position. The determining may further include using seasonal variations in the frequency with which mail is delivered to stops along the carrier route to determine the position. The receiving mail pieces in a first mail conveyor may include receiving the mail pieces at a reception end of the first mail conveyor, and the method may further include moving the mail pieces in a dispatch direction towards a dispatch end of the first mail conveyor by driving the first mail conveyor. The first mail conveyor may be a first helical conveyor having a plurality of coils and the mail pieces are held in slots or gaps between the coils, the driving the first mail conveyor may include rotating the plurality of coils. The method may further include unloading the mail pieces from the second mail conveyor into an output tray in the order in which the mail pieces will be delivered on the carrier route. The unloading step may include driving the second mail conveyor to convey the mail pieces in the second mail conveyor in a dispatch direction parallel to the longitudinal axis of the second mail conveyor. The second mail conveyor may be a second helical conveyor having a plurality of coils and holds the mail pieces in the slots or gaps between the coils; and wherein the driving the second mail conveyor includes rotating the plurality of coils. Each of the positions of the second mail conveyor into which a mail piece is placed may be one of the slots or gaps between the plurality of coils of the second helical conveyor.

Another aspect of the invention is a mail sorting and dispatch method including the steps of: singulating mail pieces from a mail stack; uniquely identifying the singulated mail pieces; transporting the singulated mail pieces along a mail path; at each of a plurality of route enhanced dispatch modules along the mail path, determining whether to sort a mail piece to the route enhanced dispatch module based on the carrier route in which the mail piece is to be delivered; if it is determined that the mail piece is to be delivered on the carrier route to which the route enhanced dispatch module is assigned, sorting the carrier mail to the route enhanced dispatch module is assigned; if it is determined that the mail piece is not to be delivered the carrier route to which the route enhanced dispatch module is assigned, allowing the mail piece to continue on the mail path to the next route enhanced dispatch module; and at each route enhanced dispatch module, performing a route enhanced dispatch method and dispatching the mail pieces sorted to each of the plurality of route enhanced dispatch modules in delivery point order.

Other features and advantages of the invention will become apparent to those of skill in the art upon reviewing the following detailed description of the preferred embodiments and the accompanying drawings.

BRIEF DESCRIPTION OF THE DRAWINGS

The accompanying drawings, which are incorporated herein and form part of the specification, illustrate a preferred embodiment of the present invention and, together with the detailed description, further serve to explain the principles of the invention and to enable a person skilled in the art to make and use the invention. In the drawings, like reference numbers are used to indicate identical or functionally similar elements.

DETAILED DESCRIPTION OF THE PREFERRED EMBODIMENTS

Figure 1:
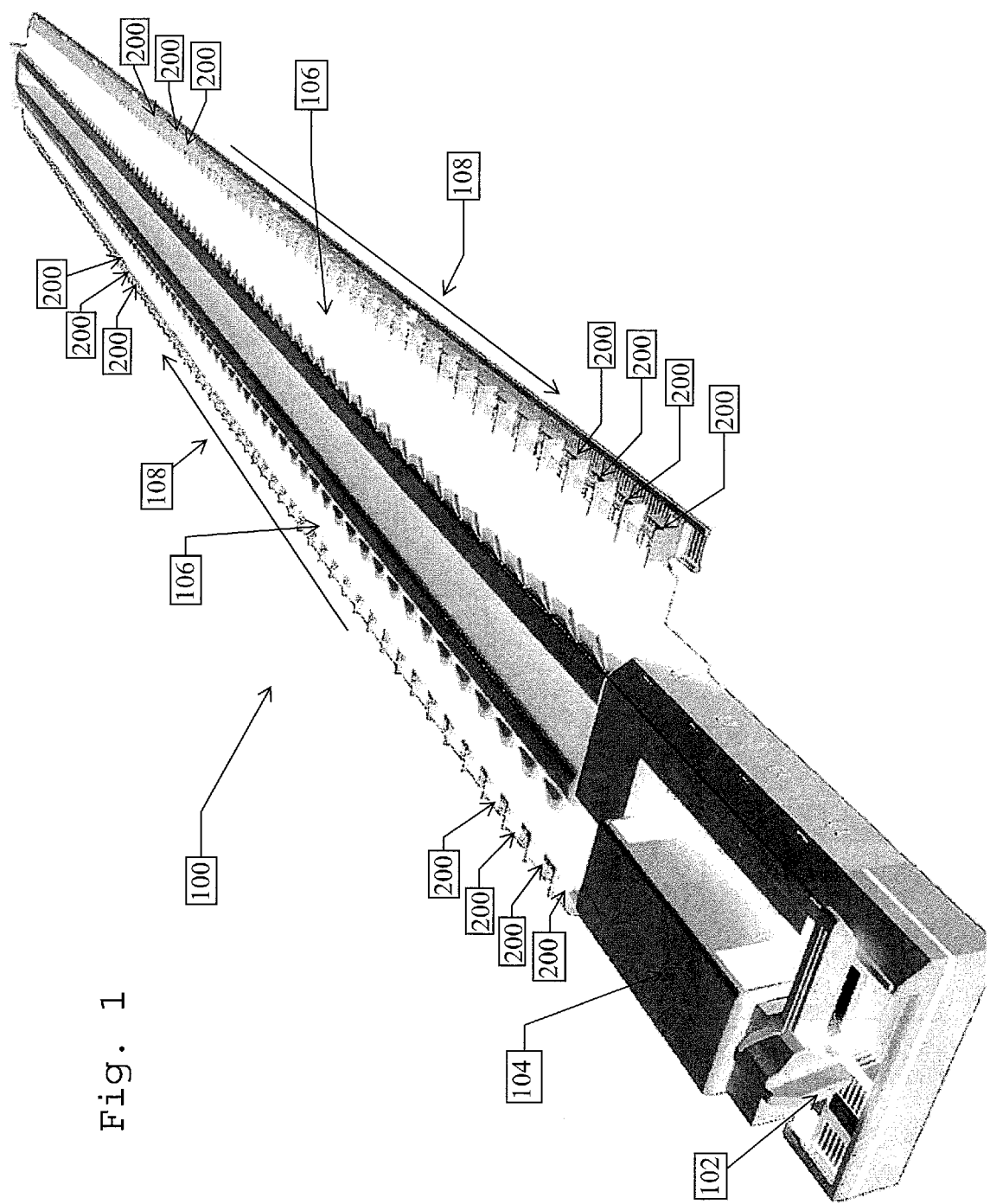
FIG. 1 is a perspective view showing the front and right side of a route enhanced mail sorting and dispatch system according to an embodiment of the present invention.
Figure 2:
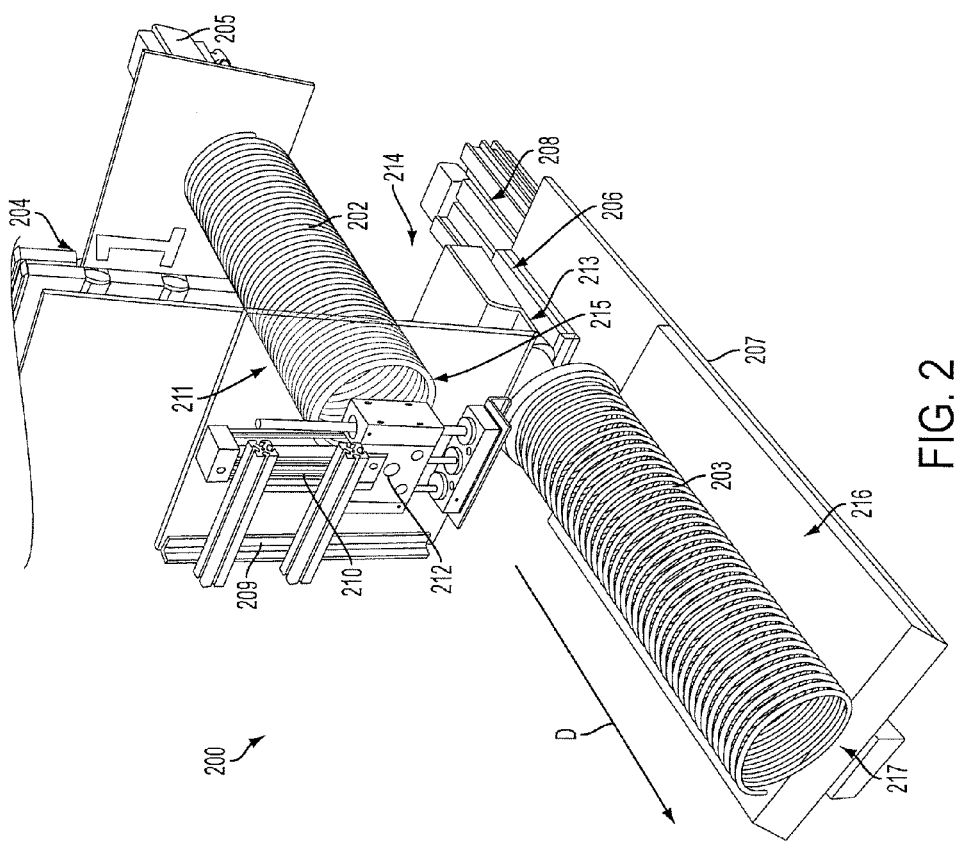
FIG. 2 is a perspective view showing the dispatch end and side of a route enhanced dispatch module for use in a mail sorting system according to an embodiment of the present invention.
Figure 3:
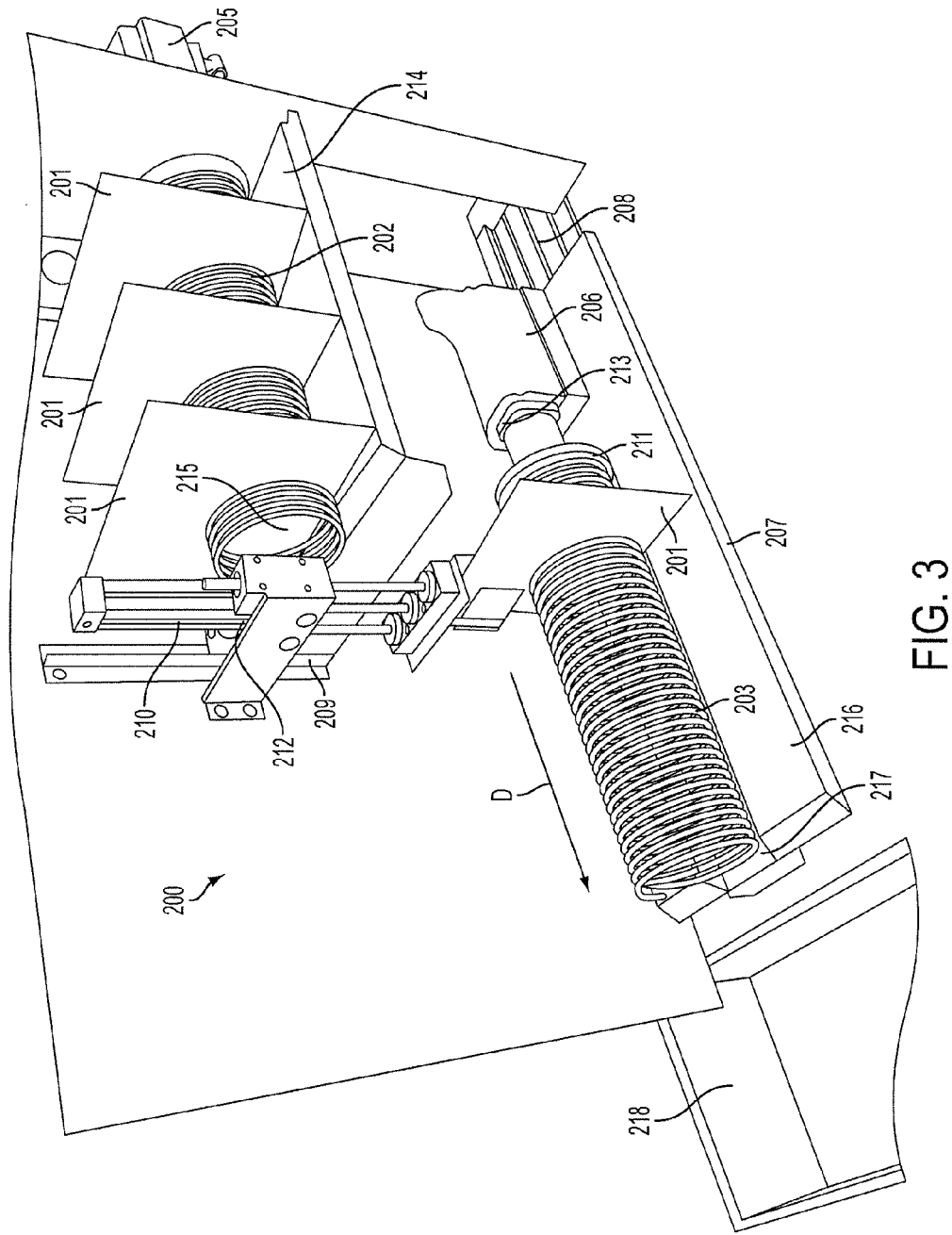
FIG. 3 is a perspective view showing the dispatch end and side of a route enhanced dispatch module in the process of sorting mail according to an embodiment of the present invention.

A route enhanced mail sorting and dispatch system 100 according to an embodiment of the present invention is shown in FIGS. 1-3. The system 100 includes a feeder 102 configured to singulate mail pieces 201 from a mail stack, an identification device 104 to uniquely identify mail pieces 201, a conveyor 106 configured to receive singulated mail from the identification device 104 and convey the mail in a vertical orientation along a mail path 108, and a plurality of route enhanced dispatch modules 200 disposed along the mail path 108. The identification device 104 may be, for example, an optical character recognition ("OCR") device capable of reading addresses and/or a bar code scanner that provide the system with information needed to determine carrier route and delivery point of each mail item. The conveyor 106 can be any type of mail conveyor but is preferably an opposed belt conveyor of the type that conveys mail on edge in a generally vertical orientation. As shown in FIG. 1, the conveyor 106 is configured to define a generally U-shaped mail path 108 with straight runs leading away from and returning to the feeder 102. The dispatch modules 200 are preferably positioned along the straight runs of the mail path 108 as shown.

In an embodiment, the dispatch modules 200 each include a mail buffer composed of an upper helical mail conveyor 202 with a plurality of coils defining slots or gaps for receiving vertically oriented mail 201 and a lower helical mail conveyor 203 with a plurality of coils defining slots or gaps for receiving vertically oriented mail pieces 201 from the mail buffer. A deflector 204 is configured to be movable across mail path 108 to deflect mail pieces 201 from the conveyor 106. The mail pieces 201 deflected by deflector 204 are received by the upper helical mail conveyor 202 in the mail slot at the reception end of the upper helical mail conveyor 202. An upper conveyor actuator 205 rotates the upper helical mail conveyor 202 about its longitudinal axis to move mail pieces 201 between the coils in a dispatch direction D substantially transverse to the plane of the mail piece 201. Similarly, lower conveyor actuator 206 rotates the lower helical mail conveyor 203 about its longitudinal axis to move mail pieces 201 between the coils in the dispatch direction D substantially transverse to the plane of the mail piece 201.

The lower helical mail conveyor 203 and lower conveyor actuator 206 are positioned on a sled or shuttle 207 which is linearly moveable along a track 208 running in the dispatch direction D. The sled is driven along track 208 by any suitable linear movement element or actuator, such as a lead screw, capable of linearly moving sled 207. Accordingly, by moving the sled 207 back and forth along the track 208 parallel to the dispatch direction D, the lower helical mail conveyor 203 is linearly translatable to any of N indexed positions, which align the slots or gaps defined by the plurality of coils of the lower mail conveyor 203 with the dispatch end of the upper mail conveyor 202.

A placement element, which is a guide 209, is positioned at the dispatch end of the upper mail conveyor 202 and above the lower mail conveyor 203. The guide 209 may move along a vertical track 210 to place mail pieces 201 received from the upper mail conveyor 202 into any of the N positions of the lower mail conveyor 203. The guide 209 includes a plate 211 and may include sensors 212. Plate 211 is lowered to guide a mail piece 201 from the upper mail conveyor 202 into a mail slot corresponding to a selected position of the lower mail conveyor 203. In a preferred embodiment, to ensure that mail pieces 201 reach their destination mail slot in the lower mail conveyor 203, plate 211 may be lowered to extend partially into the mail slot of the selected position of the lower mail conveyor 203. Plate 211 can be, for example, a rigid or semi-rigid rectangular plastic sheet. Sensors 212 detect when a mail piece 201 drops from the upper mail conveyor 202 to the lower mail conveyor 203. In addition, a ledge 213 is positioned at the dispatch end of the upper mail conveyor 202 adjacent to plate 211. Ledge 213 has a horizontal surface which is lower than a horizontal upper surface 214. Ledge 213 and plate 211 create a narrow gap through which the mail pieces 201 fall into the lower mail conveyor 203.

The upper helical mail conveyor 201 is positioned above the upper surface 214. The upper surface 214 has an upper groove 215 running in the dispatch direction D. The bottom portions of the plurality of coils of the upper mail conveyor 202 extend into upper groove 215. Upper groove 215 enables the upper surface 214 to support the bottoms of the vertically oriented mail pieces 201 on both sides of upper groove 215 because the bottoms of the plurality of coils of the upper mail conveyor 202 extend into upper groove 215 to pass underneath the bottoms of the vertically oriented mail pieces 201. As a result, the bottoms of the vertically oriented mail pieces 201 rest flat against upper surface 214 while the mail pieces 201 are located in the slots or gaps defined by the plurality of coils of the upper mail conveyor 202. This arrangement maintains proper orientation of the mail pieces as they are moved linearly by operation of the upper helical mail conveyor 201.

The lower helical mail conveyor 203 is positioned above a lower surface 216. The lower surface 216 has a lower groove 217 running in the dispatch direction D. The bottom portions of the plurality of coils of the lower mail conveyor 203 extend into lower groove 217. Having an effect similar to that of upper groove 215, lower groove 217 enables the bottoms of the vertically oriented mail pieces 201 to rest flat against lower surface 216 while the mail pieces 201 are located in the slots or gaps defined by the plurality of coils of the lower mail conveyor 203.

An output tray 218 receives mail from the lower mail conveyor 203 in delivery point order (i.e., the order in which mail pieces 201 are to be delivered on the carrier route) after completion of the route enhanced mail sorting method. In an embodiment, the output tray 218 is a standard street tray of the type normally used by mail carriers on their route.

Figure 4:
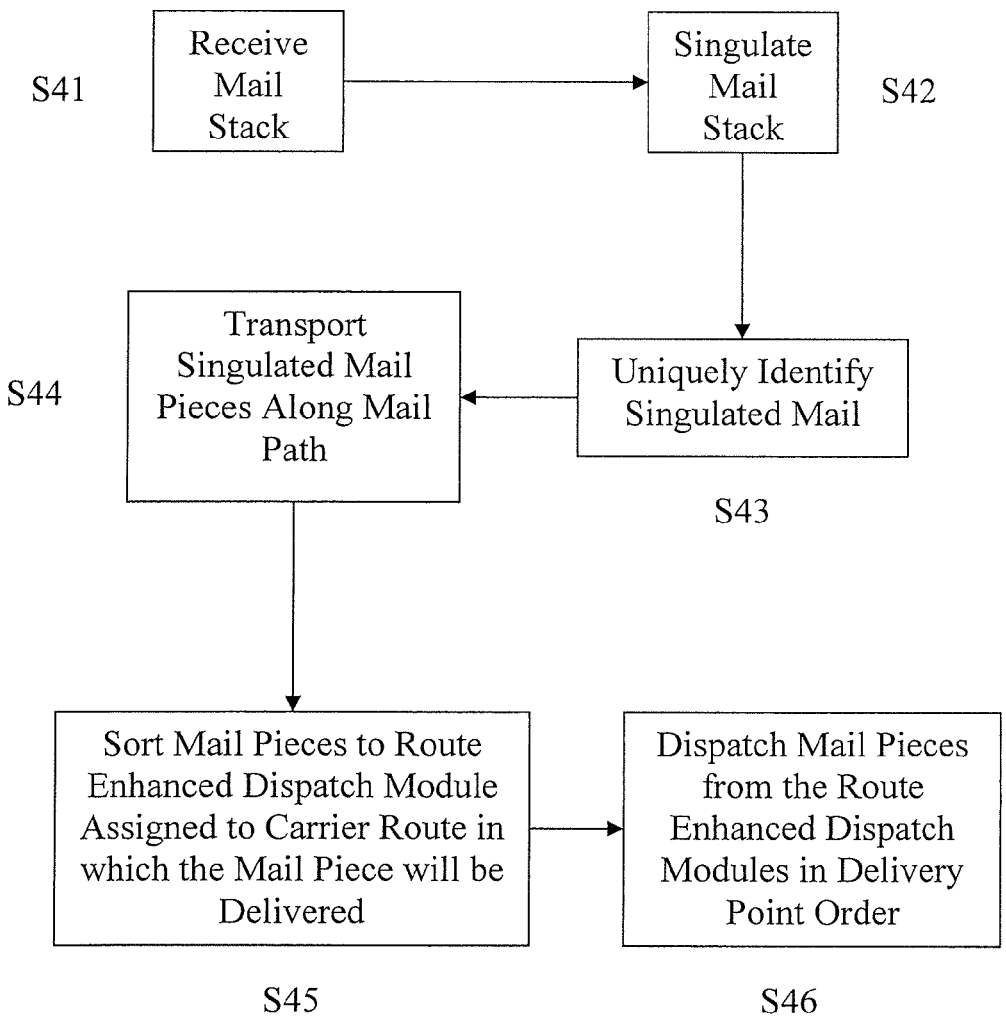
FIG. 4 is a flow chart showing a system-level method of route enhanced mail sorting and dispatching according to an embodiment of the present invention.

In operation, as shown in FIG. 4, route enhanced mail sorting and dispatch system 100 receives a stack of randomly ordered mail pieces 201 for a plurality of carrier routes (step S41). Feeder 102 singulates the mail pieces 201 from the mail stack (step S42). The singulated mail pieces 201 are then fed into identification device 104, which uniquely identifies mail pieces 201 through OCR or bar code scanning and creates mail piece data for each mail piece 201 (step S43). Conveyor 106 then conveys mail pieces 201 in a vertical orientation along mail path 108 (step S44). In a preferred embodiment, each of the plurality of route enhanced dispatch modules 200 disposed along mail path 108 are assigned to a particular carrier route. As a mail piece 201 is conveyed along mail path 108 by conveyor 106, at each of the plurality of route enhanced dispatch modules 200, the mail piece data for the mail piece 201 is used to determine whether the mail piece 201 is to be delivered on the carrier route to which the route enhanced dispatch module 200 is assigned. If it is determined that the mail piece is to be delivered on the carrier route to which the route enhanced dispatch module 200 is assigned, the deflector 204 of the dispatch module 200 deflects the mail piece 201 off of the mail path 108 and into the dispatch module 200. The deflector 204 may deflect mail pieces 201 by extending from a retracted position spaced from the mail path 108 to an extended position protruding across mail path 108 at an angle leading to a gap between coils of the upper helical mail conveyor 202. Otherwise, if it is not determined that the mail piece is to be delivered on the carrier route to which the route enhanced dispatch module 200 is assigned, the mail piece 201 continues along the mail path 108 to the next of the plurality of dispatch modules 200. Accordingly, each of the plurality of route enhanced dispatch modules 200 receives mail pieces 201 for a particular carrier route (step S45). The mail pieces 201 received by the plurality of route enhanced dispatch modules 200 may be in random order. Regardless, the plurality of dispatch modules 200 can automatically arrange the received mail pieces 201 and output them in delivery point order (step S46).

Figure 5:
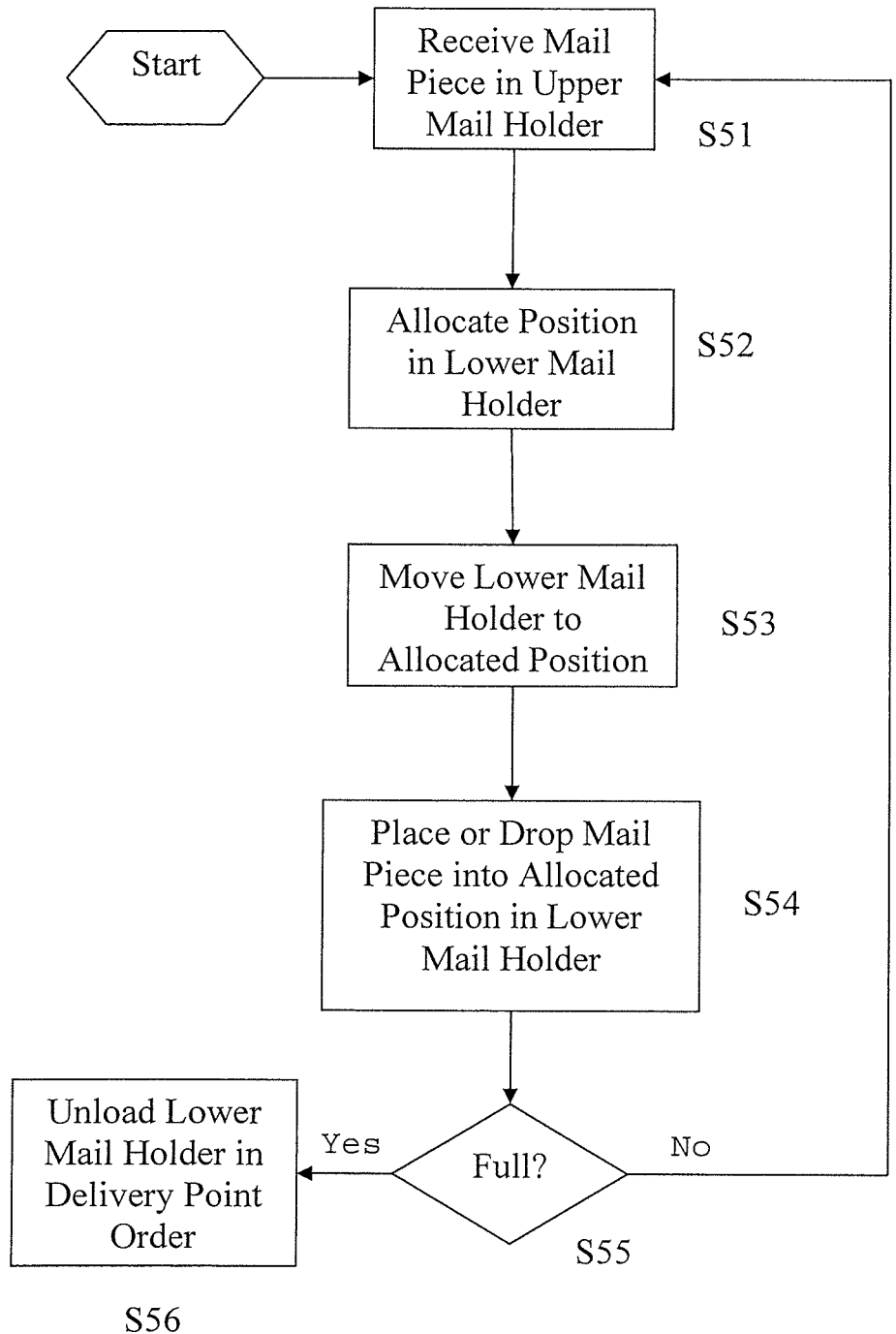
FIG. 5 is a flow chart showing a module-level method of route enhanced mail sorting and dispatching according to an embodiment of the present invention.

Referring to FIG. 5, when a mail piece 201 for a particular carrier route is sorted into a route enhanced dispatch module 200 by deflector 204, the vertically oriented mail piece 201 is received between coils at the reception end of the upper helical mail conveyor 202 (step S51). For each mail piece 201 sorted to route enhanced dispatch module 200 and received by upper mail conveyor 202, upper conveyor actuator 205 rotates the upper helical mail conveyor 202 at least one rotation to move the mail piece 201 just received, and any other mail pieces 201 on the upper mail conveyor 202, at least one rotation closer to the guide 209. By doing so, mail control is maintained and the mail pieces 201 received by the upper mail conveyor 202 are kept separated. However, even when the upper mail conveyor 202 is not receiving new mail pieces 201, if there are mail pieces on the upper mail conveyor 202, upper conveyor actuator 205 rotates the upper helical mail conveyor 202 to move the mail pieces 201 towards the guide 209. To reduce power consumption, the upper mail conveyor 202 may be rotated only when mail pieces 201 are on the upper mail conveyor 202. Alternatively, for increased simplicity of design, the upper mail conveyor 202 may rotate constantly even when there are no mail pieces 201 on the upper mail conveyor 201.

Additional stability is provided in the route enhanced dispatch modules 200 because, while mail pieces 201 are in respective slots or gaps in the plurality of coils of the upper helical mail conveyor 202, mail pieces 201 rest flat against horizontal upper surface 214. Mail pieces 201 are enabled to rest flat against upper surface 214 because upper groove 215 allows the bottom portions of the plurality of coils of the upper mail conveyor 202 to pass below the mail pieces 201. As a result, mail pieces rest flat against horizontal upper surface 214 on both sides of upper groove 215 while the mail pieces 201 are moved toward guide 209.

A deterministic algorithm allocates a position on the lower helical mail conveyor 203 for each mail piece 201 on the upper helical mail conveyor 202 (step S52). Each allocated position corresponds to a particular slot or gap defined by the plurality of coils of the lower mail conveyor 203. For each mail piece 201 in the upper mail conveyor 202, the deterministic algorithm uses at least carrier route data and mail piece data (i.e., data specific to the mail piece 201 for which a position is to be allocated) to allocate a position in the lower helical conveyor 203 for the mail piece 201.

The goal of the deterministic algorithm is for the positions in the lower helical conveyor 203 to be allocated in such a way that all of the mail pieces 201 to be delivered on the carrier route are in delivery point order. To achieve this goal, the deterministic algorithm allocates a position in the lower helical conveyor 203 which is calculated to increase the likelihood that all of the mail pieces 201 to be delivered on the carrier route can be dropped or placed into the lower helical conveyor 203 in delivery point order. In allocating a position in the lower helical mail conveyor 203, the deterministic algorithm may consider the positions to which mail pieces 201 have already been allocated. In an embodiment, the carrier route and delivery point for at least a portion of the mail pieces 201 is known even before the mail pieces are fed into identification device 104, and the deterministic algorithm uses this pre-identification mail data in the allocation of positions in the lower helical conveyer 203. However, because pre-identification mail data may not be available for every mail piece 201, in allocating positions in the lower helical conveyer 203, the deterministic algorithm may also consider historical statistical data to determine the frequency with which each stop on the carrier route typically receives mail. The historical statistical data may also reflect seasonal variations, such as a spike in mailings before Mother's Day. In the event that the deterministic algorithm is unable to allocate a position for a mail piece 201 in delivery point order, the deterministic algorithm will allocate a position at the end of the lower helical conveyer 203 for manual insertion in delivery point order.

Sled 207 is moved along track 208 in accordance with the allocated position to enable the guide 209 to drop or place the mail piece 201 into the position allocated by the deterministic algorithm (step S53). Specifically, sled 207 is moved to position the lower helical mail conveyor 203 so that the slot or gap defined by the plurality of coils of the lower mail conveyor 203 corresponding to the allocated position is below the guide 209. Once the lower helical mail conveyor 203 has been positioned correctly below the guide 209, plate 211 is lowered along vertical track 210. To increase accuracy in placing the mail piece 201 into the allocated position of the lower helical mail conveyor 203, plate 211 may be lowered so as to extend into the slot or gap created by the coils of the lower mail conveyor 203. By the time a mail piece 201 has reached the guide 209, the lower helical mail conveyor 203 has been positioned below the guide 209 according to the allocated position and plate 211 has been lowered. The guide 209 then accurately drops or places the mail piece 201 into the slot corresponding to the allocated position on the lower helical mail conveyor 203 (step S54).

The accuracy of the guide 209 in placing a mail piece 201 into the allocated position of the lower helical conveyor may be increased through the use of a ledge 213 positioned at the dispatch end of upper surface 214 and adjacent to plate 211. As a mail piece 201 is moved in the dispatch direction D toward the guide 209 by rotation of the upper helical mail conveyor 202, when the mail piece 201 reaches the end of horizontal upper surface 214, the mail piece 201 drops to the horizontal surface of ledge 213. While the mail piece 201 rests on ledge 213, the upper helical mail conveyor 202 continues to be moved in the dispatch direction D by the rotation of the plurality of coils of the upper helical mail conveyor 202. When the mail piece 201 reaches the end of the horizontal surface of ledge 213, the mail piece 201 falls through narrow gap between plate 211 and ledge 213 to be accurately placed in the allocated position of lower helical mail conveyor 203.

Accuracy in the placement of mail pieces 201 into the allocated positions of lower helical mail conveyor 203 may be further improved by the inclusion of sensors 212 in guide 209. The sensors 212 may be used to detect when mail piece 201 falls from the upper helical mail conveyor 202 into the lower helical mail conveyor 203. As a result, the route enhanced dispatch module 200 will not begin preparing for placement of the next mail piece 201 until the current mail piece 201 has been positioned in the lower mail conveyor 203.

Once a mail piece 201 is placed into the lower helical mail conveyor 203, the route enhanced dispatch module 200 prepares for placement of the next mail piece 201. For example, dispatch module 200 is prepared for placement of the next mail piece 201 by raising plate 211, moving sled 207 along track 208 to position lower mail conveyor 203 so that the mail slot corresponding to the position allocated for the next mail piece is below the guide 209, and lowering plate 211.

When the dispatch module 200 is full or when a discharge instruction is received, lower conveyor actuator 206 rotates the lower helical mail conveyor 203 to move the mail pieces 201 in slots of the lower mail conveyor 203 in the dispatch direction D (step S55). By doing so, the mail pieces 201 are dispatched into output tray 218 in delivery point order (step S56). Module 200 is determined to be full when the number of mail pieces 201 in the lower mail conveyor 203 is equal to a fullness threshold F. It is not required that fullness threshold F be equal to the number of positions N corresponding to the mail slots defined by the plurality of coils of the lower mail conveyor 203. For example, in one embodiment, the lower mail conveyor 203 has 250 positions (i.e., N=250), and module 200 is determined to be full when 200 of the 250 positions are occupied by mail pieces 201 (i.e., F=200).

Here again, additional stability is provided in the route enhanced dispatch modules 200 because, while mail pieces 201 are in respective slots or gaps in the plurality of coils of the lower helical mail conveyor 203, mail pieces 201 rest flat against horizontal lower surface 216 on both sides of lower groove 217 while the mail pieces 201 are moved toward output tray 218.

Figure 6:
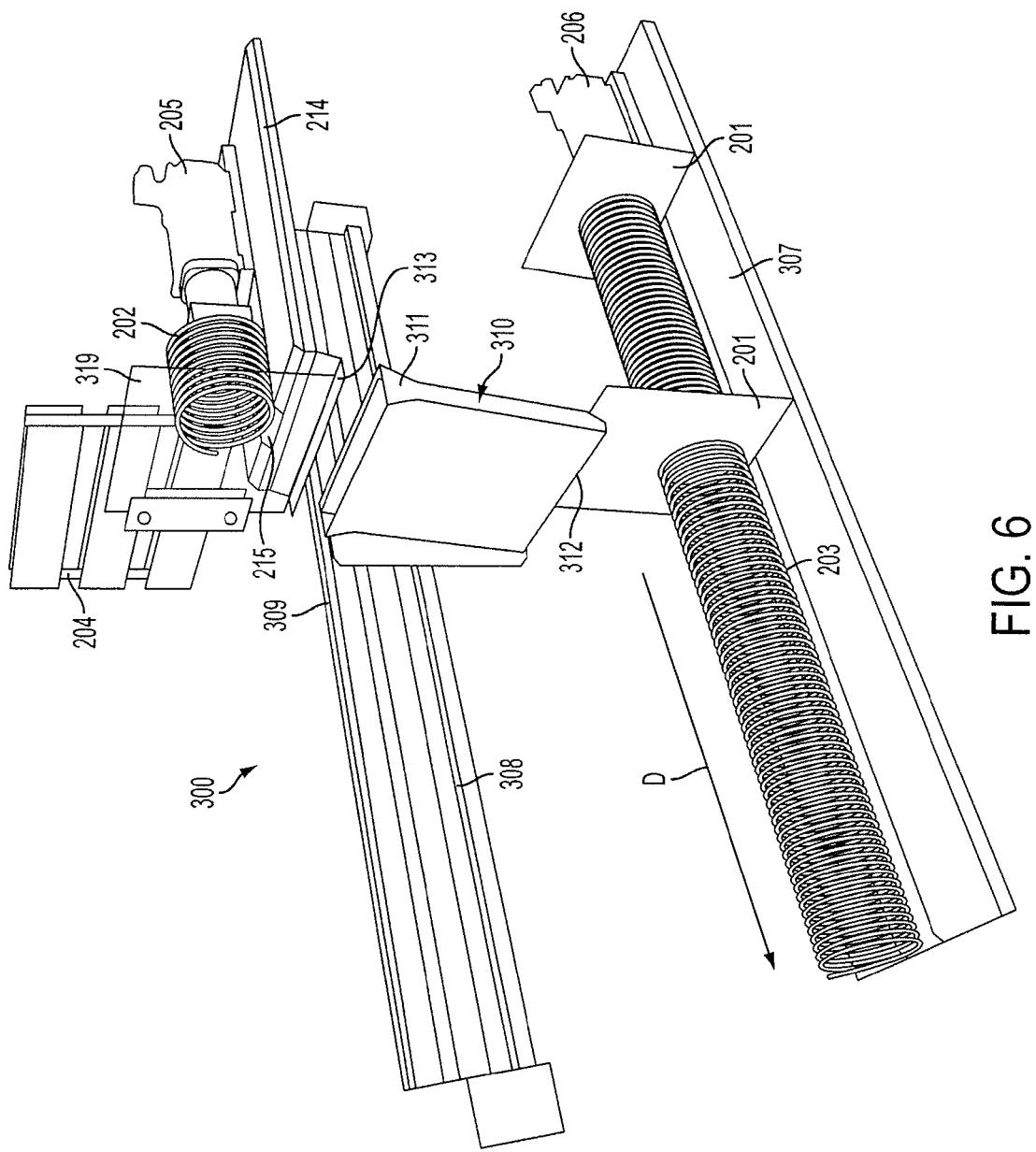
FIG. 6 is a perspective view showing the dispatch end and side of a route enhanced dispatch module in the process of sorting mail according to an embodiment of the present invention.
Figure 7:
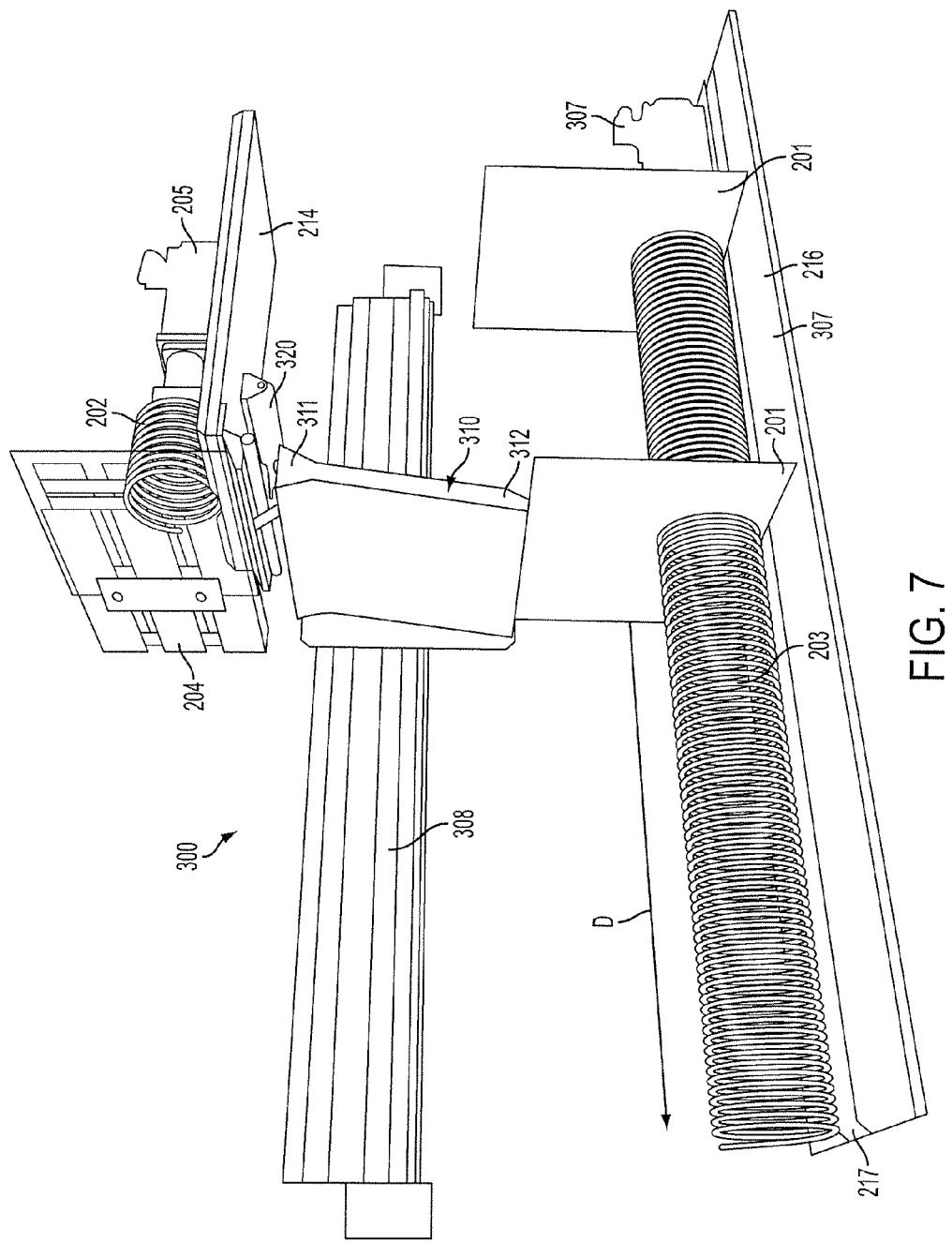
FIG. 7 is a perspective view showing the dispatch end and side of a route enhanced dispatch module in the process of sorting mail according to an embodiment of the present invention.

In another embodiment, some or all of the dispatch modules 200 may have the configuration of dispatch module 300, shown in FIGS. 6 and 7. Since the dispatch modules 300 are similar in many respects to dispatch modules 200, corresponding portions will be denoted by the same reference numerals. Dispatch modules 300 operate in a manner similar to dispatch modules 200 with the main exception being that a put-away shuttle moves the guide along a track while the lower helical mail conveyor 203 remains stationary.

Dispatch modules 300 each include a mail buffer composed of an upper helical mail conveyor 202 with a plurality of coils defining slots or gaps for receiving vertically oriented mail 201 and a lower helical mail conveyor 203 with a plurality of coils defining slots or gaps for receiving vertically oriented mail pieces 201 from the mail buffer. A deflector 204 is configured to be movable across mail path 108 to deflect mail pieces 201 from the conveyor 106. The mail pieces 201 deflected by deflector 204 are received by the upper helical mail conveyor 202 in the mail slot at the reception end of the upper helical mail conveyor 202. An upper conveyor actuator 205 rotates the upper helical mail conveyor 202 about its longitudinal axis to move mail pieces 201 between the coils in a dispatch direction D substantially transverse to the plane of the mail piece 201. Similarly, lower conveyor actuator 206 rotates the lower helical mail conveyor 203 about its longitudinal axis to move mail pieces 201 between the coils in the dispatch direction D substantially transverse to the plane of the mail piece 201. The lower helical mail conveyor 203 and lower conveyor actuator 206 are positioned on a stationary platform 307.

A placement element, which is a put-away shuttle 309, is positioned at the dispatch end of the upper mail conveyor 202 and above the lower mail conveyor 203. The put-away shuttle 309 is linearly moveable along a track 308 oriented parallel to the dispatch direction D. Put-away shuttle 309 is driven along track 308 by any suitable linear movement element or actuator, such as a lead screw, capable of linearly moving put-away shuttle 309. Accordingly, by moving the put-away shuttle 309 back and forth along the track 308 parallel to the dispatch direction D, the put-away shuttle 309 is linearly translatable to any of N indexed positions, which correspond to the slots or gaps defined by the plurality of coils of the lower helical mail conveyor 203.

The put-away shuttle 309 includes a basket or holder 310 and may include sensors 311 and 312. The holder 310 is shown as an elongate box with an open top that extends along the ledge to receive mail pieces 201. The top is preferably flared outwardly to more reliably receive and guide the mail pieces 201 into the holder 310. The bottom of the holder 310 is defined by a door that is movable between a closed position that supports a mail piece 201 dropped from the upper mail conveyor 202 and an open position that allows the mail piece 201 to drop out of the holder 310 into the lower mail conveyor 203. Sensors 311 detect when a mail piece 201 drops from the upper mail conveyor 202 to the holder 310, and sensors 312 detect when a mail piece 201 drops from the holder 310 to lower mail conveyor 203. In addition, a ledge 313 is positioned at the dispatch end of the upper mail conveyor 202 adjacent to a plate 319. Ledge 313 has a horizontal surface which is lower than a horizontal upper surface 214. When holder 310 of the put-away shuttle is positioned below the ledge 213, an actuator 320 opens ledge 213 so that a narrow gap through which the mail pieces 201 fall into holder 310 is created.

The upper helical mail conveyor 201 is positioned above the upper surface 214. The upper surface 214 has an upper groove 215 running in the dispatch direction D. The bottom portions of the plurality of coils of the upper mail conveyor 202 extend into upper groove 215. Upper groove 215 enables the upper surface 214 to support the bottoms of the vertically oriented mail pieces 201 on both sides of upper groove 215 because the bottoms of the plurality of coils of the upper mail conveyor 202 extend into upper groove 215 to pass underneath the bottoms of the vertically oriented mail pieces 201. As a result, the bottoms of the vertically oriented mail pieces 201 rest flat against upper surface 214 while the mail pieces 201 are located in the slots or gaps defined by the plurality of coils of the upper mail conveyor 202. This arrangement maintains proper orientation of the mail pieces as they are moved linearly by operation of the upper helical mail conveyor 201.

The lower helical mail conveyor 203 is positioned above a lower surface 216. The lower surface 216 has a lower groove 217 running in the dispatch direction D. The bottom portions of the plurality of coils of the lower mail conveyor 203 extend into lower groove 217. Having an effect similar to that of upper groove 215, lower groove 217 enables the bottoms of the vertically oriented mail pieces 201 to rest flat against lower surface 216 while the mail pieces 201 are located in the slots or gaps defined by the plurality of coils of the lower mail conveyor 203.

Similar to dispatch module 200, dispatch module 300 has an output tray 218 that receives mail from the lower mail conveyor 203 in delivery point order (i.e., the order in which mail pieces 201 are to be delivered on the carrier route) after completion of the route enhanced mail sorting method. In an embodiment, the output tray 218 is a standard street tray of the type normally used by mail carriers on their route.

At a system level, route enhanced mail sorting and dispatch system 100 operates in the manner shown in FIG. 4 regardless of whether dispatch modules 200 or dispatch modules 300 are used. At the dispatch module level, dispatch module 300 operates in the manner shown in FIG. 5 except that, after a position has been allocated by the deterministic algorithm (step S52), in step S53 of this embodiment, put-away shuttle 309 is moved along track 308 in accordance with the allocated position to enable the holder 310 to drop or place the mail piece 201 into the position allocated by the deterministic algorithm in step S52. Specifically, put-away shuttle 309 is moved to position the lower helical mail conveyor 203 so that the slot or gap defined by the plurality of coils of the lower mail conveyor 203 corresponding to the allocated position is below the holder 310. Once the holder 310 of the put-away shuttle 309 has been positioned correctly above the lower helical mail conveyor 203, holder 310 drops or places the mail piece 201 into a slot of the lower helical mail conveyor 203 corresponding to the allocated position.

As a mail piece 201 is moved in the dispatch direction D toward plate 319 by rotation of the upper helical mail conveyor 202, when the mail piece 201 reaches the end of horizontal upper surface 214, the mail piece 201 drops to the horizontal surface of ledge 313. While in a closed position, ledge 313 prevents a mail piece from prematurely falling into the lower helical mail conveyor 203. When holder 310 is positioned below ledge 313 and is ready to receive the mail piece 201, actuator 320 opens 313 and the mail piece 201 falls into the holder 310.

Accuracy in the placement of mail pieces 201 into the allocated positions of lower helical mail conveyor 203 may be improved by the inclusion of sensors 311 and 312 in holder 310. Sensors 311 may be used to detect when a mail piece 201 drops from the upper mail conveyor 202 to the holder 310, and sensors 312 may be used to detect when a mail piece 201 drops from the holder 310 to lower mail conveyor 203.

Once a mail piece 201 is placed into the lower helical mail conveyor 203, the route enhanced dispatch module 300 prepares for placement of the next mail piece 201. For example, dispatch module 300 is prepared for placement of the next mail piece 201 by closing ledge 313 and moving the put-away shuttle along track 308 to position below ledge 313.

Here again, additional stability is provided in the route enhanced dispatch modules 300 because, while mail pieces 201 are in respective slots or gaps in the plurality of coils of the lower helical mail conveyor 203, mail pieces 201 rest flat against horizontal lower surface 216 on both sides of lower groove 217 while the mail pieces 201 are moved toward output tray 218.

While the invention has been particularly taught and described with reference to certain preferred embodiments, those versed in the art will appreciate that modifications in form and detail may be made without departing from the spirit and scope of the invention. For example, although the upper and lower mail conveyors 202 and 203, respectively, are shown as helical mail conveyors having mail slots defined by a plurality of rotatable coils, embodiments of the present invention may be realized using any conveyer capable receive vertically oriented mail pieces and conveying them in vertical orientation in a dispatch direction. For instance, mail conveyors having a conveyor belt, on which a plurality of mail slots are disposed, or accordion shaped folders may alternatively be used. Also, it is not necessary that the upper and lower mail conveyors 202 and 203, respectively, be of the same type.

For another example, the bottom portions of the plurality of coils of the upper and lower helical mail conveyors 201 and 202 have been shown as partially extending into upper groove 215 in upper surface 210 and lower groove 213 in lower surface 212, respectively. However, the upper and lower surfaces 210 and 212 may instead each be flat surfaces having no groove. As a result, the plurality of coils of the upper and lower helical mail conveyors 201 and 202 would be completely above the upper and lower surfaces 210 and 212, respectively. Further, the bottom portions of the vertically oriented mail pieces 201 in the mail slots would rest in a slanted fashion with a middle portion supported by the bottom portions of the coils and one corner supported by surface 210 or 212.

In addition, although FIG. 5 shows the position allocation occurring in step S52 after the mail piece has been received in the upper mail holder 202 in step S51, the deterministic algorithm may allocate a position for a mail piece any time after the mail piece is uniquely identified by identification device 104.

These and other modifications of the present invention are intended to be within the scope of the appended claims.

The invention claimed is:

1. A route enhanced dispatch module for sorting mail pieces into delivery point order, the route enhanced dispatch module comprising:
   a first mail conveyor having a first plurality of mail slots;
   a second mail conveyor having a second plurality of mail slots;
   a placement element configured to receive a mail piece from said first mail conveyor and place the mail piece into said second mail conveyor; and
   a linear movement element configured to linearly move said second mail conveyor to align said placement element with one of said plurality of mail slots in said second mail conveyor;
   wherein said first mail conveyor is configured to convey a mail piece in said first plurality of mail slots in a dispatch direction towards said placement element;
   wherein said second mail conveyor is configured to convey a mail piece in said second plurality of mail slots in a dispatch direction towards a dispatch end of said second mail conveyor; and
   wherein at least one of said placement element and said second mail conveyor is configured to be moveable relative to the other of said placement element and said second mail conveyor.

2. The module of claim 1, wherein said placement element includes a guide movable in a vertical direction between a first position adjacent said first mail conveyor and a second position adjacent said second mail conveyor.

3. The module of claim 2, wherein said guide in said second position extends partially into one of the plurality of mail slots of said second mail conveyor.

4. The module of claim 2, wherein said first mail conveyor includes a first horizontal surface extending to a dispatch end and a ledge having a horizontal surface positioned lower than said first horizontal surface at said dispatch end.

5. A route enhanced dispatch module for sorting mail pieces into delivery point order, the route enhanced dispatch module comprising:
a first mail conveyor having a first plurality of mail slots;
a second mail conveyor having a second plurality of mail slots; and
a placement element configured to receive a mail piece from said first mail conveyor and place the mail piece into said second mail conveyor;
wherein said first mail conveyor is configured to convey a mail piece in said first plurality of mail slots in a dispatch direction towards said placement element;
wherein said second mail conveyor is configured to convey a mail piece in said second plurality of mail slots in a dispatch direction towards a dispatch end of said second mail conveyor;
wherein at least one of said placement element and said second mail conveyor is configured to be moveable relative to the other of said placement element and said second mail conveyor; and
wherein said placement element includes sensors configured to detect when a mail piece is placed into said second mail conveyor.

6. A route enhanced dispatch module for sorting mail pieces into delivery point order, the route enhanced dispatch module comprising:
a first mail conveyor having a first plurality of mail slots;
a second mail conveyor having a second plurality of mail slots; and
a placement element ent configured to receive a mail piece from said first mail conveyor and place the mail piece into said second mail conveyor;
wherein said first mail conveyor is configured to convey a mail piece in said first plurality of mail slots in a dispatch direction towards said placement element;
wherein said second mail conveyor is configured to convey a mail piece in said second plurality of mail slots in a dispatch direction towards a dispatch end of said second mail conveyor;
wherein at least one of said placement element and said second mail conveyor is configured to be moveable relative to the other of said placement element and said second mail conveyor; and
wherein said placement element includes a put-away shuttle configured to hold a mail piece.

7. The module of claim 6 further comprising a linear movement element configured to linearly move said put-away shuttle along a track extending in a direction parallel to a longitudinal axis of said second mail conveyor.

8. The module of claim 6, wherein said put-away shuttle includes a container configured to place mail pieces into the second mail conveyor after the linear movement element moves said put-away shuttle to a determined position of said plurality of positions along said linear axis parallel to said longitudinal axis of said second mail conveyor.

9. The module of claim 8 further comprising:
a moveable ledge positioned at the dispatch end of said first mail conveyor and above said container and configured to pivot between a closed position having a substantially horizontal surface and an open position having a substantially vertical surface; and
an actuator configured to move the ledge between the open and closed positions;
wherein the substantially horizontal surface of said ledge when in the closed position is lower than a first horizontal surface positioned below said first mail conveyor, and wherein mail pieces are dropped into said container when said ledge is in the open position.

10. A route enhanced dispatch module for sorting mail pieces into delivery point order, the route enhanced dispatch module comprising:
a first mail conveyor having a first plurality of mail slots;
a second mail conveyor having a second plurality of mail slots; and
a placement element configured to receive a mail piece from said first mail conveyor and place the mail piece into said second mail conveyor;
wherein said first mail conveyor is configured to convey a mail piece in said first plurality of mail slots in a dispatch direction towards said placement element;
wherein said second mail conveyor is configured to convey a mail piece in said second plurality of mail slots in a dispatch direction towards a dispatch end of said second mail conveyor;
wherein at least one of said placement element and said second mail conveyor is configured to be moveable relative to the other of said placement element and said second mail conveyor; and
wherein the first mail conveyor is a first helical conveyor with a plurality of longitudinally spaced coils defining the first plurality of mail slots therebetween, and
wherein said first mail conveyor is configured to convey mail pieces in the first plurality of mail slots in the dispatch direction through rotation of the coils.

11. The module of claim 10, wherein the module further comprises a first horizontal surface below said first helical conveyor, wherein the mail pieces in said first helical conveyor rest on the first horizontal surface.

12. The module of claim 11, wherein said first horizontal surface has a first groove running in the dispatch direction, wherein coils of said first helical conveyor extend into said groove.

13. A route enhanced dispatch module for sorting mail pieces into delivery point order, the route enhanced dispatch module comprising:
a first mail conveyor having a first plurality of mail slots;
a second mail conveyor having a second plurality of mail slots; and
a placement element configured to receive a mail piece from said first mail conveyor and place the mail piece into said second mail conveyor;
wherein said first mail conveyor is configured to convey a mail piece in said first plurality of mail slots in a dispatch direction towards said placement element;
wherein said second mail conveyor is configured to convey a mail niece in said second plurality of mail slots in a dispatch direction towards a dispatch end of said second mail conveyor;
wherein at least one of said placement element and said second mail conveyor is configured to be moveable relative to the other of said placement element and said second mail conveyor; and
wherein said second mail conveyor is a second helical conveyor with a plurality of longitudinally spaced coils defining the second plurality of mail slots therebetween, and
wherein the mail pieces in the second plurality of mail slots are conveyed in the dispatch direction through rotation of the coils.

14. The module of claim 13, further comprising a second horizontal surface below said second helical conveyor, wherein the mail pieces in the second helical conveyor rest on the second horizontal surface.

15. The module of claim 14, wherein the second horizontal surface has a second groove running in the dispatch direction, wherein coils of the second helical conveyor extend into the second groove.

* * * * *